United States Patent
Islam et al.

(10) Patent No.: US 8,935,756 B2
(45) Date of Patent: *Jan. 13, 2015

(54) PROVIDING MULTIPLE AUTHENTICATIONS TO AUTHENTICATE USERS WITH RESPECT TO A SYSTEM AND FILE SYSTEMS OFFERED THROUGH THE SYSTEM

(75) Inventors: Shah Mohammad R. Islam, Tucson, AZ (US); Sandeep R. Patil, Elmsford, NY (US); Sachin C. Punadikar, Pune (IN); Vipin Rathor, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,862

(22) Filed: May 18, 2012

(65) Prior Publication Data
US 2013/0254852 A1    Sep. 26, 2013

Related U.S. Application Data

(63) Continuation of application No. 13/430,519, filed on Mar. 26, 2012.

(51) Int. Cl.
*H04L 29/06* (2006.01)

(52) U.S. Cl.
USPC .............................. 726/4; 713/155; 713/183

(58) Field of Classification Search
CPC .............. H04L 63/0815; H04L 63/105; G06F 21/6218; G06F 21/41
USPC ...................... 726/4; 713/155, 183
See application file for complete search history.

(56) References Cited

U.S. PATENT DOCUMENTS

| | | | |
|---|---|---|---|
| 5,987,506 A * | 11/1999 | Carter et al. ................... | 709/213 |
| 6,006,018 A * | 12/1999 | Burnett et al. ................ | 709/219 |
| 6,182,076 B1 | 1/2001 | Yu et al. | |
| 7,519,813 B1 * | 4/2009 | Cox et al. ....................... | 713/165 |
| 7,650,505 B1 | 1/2010 | Masurkar | |
| 7,703,131 B1 * | 4/2010 | Amit et al. ......................... | 726/8 |
| 7,930,487 B1 * | 4/2011 | Faibish et al. ................. | 711/147 |
| 8,201,231 B2 | 6/2012 | Williams et al. | |
| 2001/0000045 A1 | 3/2001 | Yu et al. | |

(Continued)

OTHER PUBLICATIONS

Carter, R., "Authentication vs, Authorization", [online][retrieved Feb. 12, 2012] http://www.duke.edu/~rob/kerberos/authvaugh.html, pp. 1-2.

(Continued)

*Primary Examiner* — Michael Pyzocha
(74) *Attorney, Agent, or Firm* — David W. Victor; Konrad Raynes Raynes Davda & Victor LLP (57) ABSTRACT

Provided are a method, system, and computer program product for providing multiple authentications to authenticate users with respect to a system and file systems offered through the system. A request is received from a user to access a system, wherein the system provides access to a plurality of file systems. A first authentication of the user with respect to the system is performed. In response to success of the first authentication with respect to the system, a request by the user is received to access a selected one of the file systems. A second authentication is performed of the user with respect to the selected file system. The user is allowed access to the selected file system in response to success of the second authentication.

36 Claims, 9 Drawing Sheets

(56) References Cited

U.S. PATENT DOCUMENTS

| | | | |
|---|---|---|---|
| 2004/0177097 | A1 | 9/2004 | Yu et al. |
| 2006/0041761 | A1* | 2/2006 | Neumann et al. ............. 713/189 |
| 2010/0106712 | A1* | 4/2010 | Mizutani ...................... 707/715 |
| 2010/0191783 | A1* | 7/2010 | Mason et al. ................. 707/822 |
| 2011/0246765 | A1 | 10/2011 | Schibuk |
| 2013/0290506 | A1 | 10/2013 | Astete et al. |

OTHER PUBLICATIONS

P. Feresten, "Storage Multi-Tenancy for Cloud Computing", SNIA Cloud Storage Initiative, Mar. 2010, pp. 1-14.

IBM Corp., "Automated File Management with IBM Active Cloud Engine", IBM Systems and Technology Solution Brief, pp. 1-6 (IBM Corp. 2011).

IBM Corp, "Method of Creating a Componentized Architecture for Unifying Resource Sharing Scenarios in Cloud Computing Environment", IP.com, IP.com #IPCOM000193146D, published Feb. 11, 2010, pp. 1-14.

IBM Corp, "System and Apparatus of Auto-Completing File Path and Intelligently Locating Files and Folders From a File System", IP.com, IP.com #IPCOM000181675D, published Apr. 9, 2009, pp. 1-8.

IP.COM, "Workload Optimized Multi-Tenant Cluster File System for Cloud Applications", IP.com #IPCOM000210139D, published Aug. 26, 2011, pp. 1-2.

T.M. Jones, "Anatomy of a Cloud Storage Infrastructure", IBM Corp., developerWorks, 2010, pp. 1-13.

A. Kurmus, et al., "A Comparison of Secure Mutli-Tenancy Architectures for Filesystem Storage Clouds", IBM Corp., IBM Research Zurich, Department of Computer Science and Engineering, UCSD, pp. 1-20, published in Proc. 12th International Middleware Conference, vol. 7049 of Lecture Notes in Computer Science, pp. 471-490. Dec. 2011. (ACM).

P. Mell, et al., "Effectively and Securely Using the Cloud Computing Paradigm", National Institute of Standards and Technology, Information Technology Laboratory, Oct. 7, 2009, pp. 1-92.

P. Mell, et al., "The NIST Definition of Cloud Computing", National Institute of Standards and Technology, Information Technology Laboratory, Version 15, Oct. 7, 2009, pp. 1-2.

S. Sundareswaran, et al., "Promoting Distributed Accountability in the Cloud", IEEE 4th International Conference on Cloud Computing, 2011, pp. 113-120.

Wikipedia, "Authentication", [online][retrieved Feb. 12, 2012] http://en.wikipedia.org/w/index.php?title=Authentication&printable=yes, pp. 1-6.

U.S. Appl. No. 13/430,519, filed Mar. 26, 2012, entitled "Providing Multiple Authentications to Authenticate Users With Respect to a System and File Systems Offerred Through the System", Invented by S.R. Islam et al., 39 pp. [18.442 (Appln)].

Preliminary Amendment for U.S. Appl. No. 13/430,519, filed May 18, 2012, 9 pp. [18.442 (PrelimAmend)].

Response dated Jul. 8, 2013, pp. 13, to Office Action dated Apr. 16, 2013, pp. 1-18, for U.S. Appl. No. 13/430,519, filed May 18, 2012, by inventors S.M.R. Islam, et al.

Notice of Allowance dated Aug. 6, 2013, pp. 1-11, for U.S. Appl. No. 13/430,519, filed May 18, 2012, by inventors S.M.R. Islam, et al.

\* cited by examiner

FIG. 1

System Information

FIG. 2

File System Entry

FIG. 3

Authentication Entry

PROVIDING MULTIPLE AUTHENTICATIONS TO AUTHENTICATE USERS WITH RESPECT TO A SYSTEM AND FILE SYSTEMS OFFERED THROUGH THE SYSTEM

CROSS-REFERENCE TO RELATED APPLICATION

This application is a continuation of U.S. patent application Ser. No. 13/430,519, filed Mar. 26, 2012, which application is incorporated herein by reference in its entirety.

BACKGROUND OF THE INVENTION

1. Field of the Invention

The present invention relates to a computer program product, system, and method for providing multiple authentication modules to authenticate users with respect to a system and file systems offered through the system.

2. Description of the Related Art

Cloud storage refers to data storage as a service where storage resources are provided to clients on demand. Cloud storage infrastructures support a multitude of users over geographically distributed storage resources. Users may archive and share data in a cloud storage facility. Users may use a file request protocol to access cloud based storage. Multiple users allocated a separate portion of the cloud based storage resources may be referred to as tenants. In a multi-tenant cloud computing environment, storage resources may be segregated for particular users and classes or groups of users.

Cloud environments may be implemented using enterprise storage solutions such as SONAS (Scale Out Network Attached Storage), offered by International Business Machines Corporation. SONAS permits configuration of storage as file systems that are designated to particular users or organizations, known as the tenant.

In cloud based storage environments, authentication of the tenants occurs with respect to a system-wide authentication with the data service provider. Tenants may restrict access to their specific storage resources by requiring authorization.

Authentication is a mechanism where the system securely identifies the users to determine whether the user is who they claim to be. Authentication mechanisms may include the use of plain text passwords, a Kerberos system, smartcards, etc. Authorization by contrast is a mechanism by which a system determines a level of access granted to a particular authenticated user by determining whether a particular authenticated user is permitted to access and perform operations with respect to resources.

One cloud storage service implementation configures a virtual machine for each tenant to control access to their storage resource, where each virtual machine may provide separate authentication so that access requests are routed to the tenant specific virtual machine for the storage resource.

There is a need in the art for improved techniques for authenticating tenants and user access to storage resources, such as cloud implemented storage.

SUMMARY

Provided are a method, system, and computer program product for providing multiple authentications to authenticate users with respect to a system and file systems offered through the system. A request is received from a user to access a system, wherein the system provides access to a plurality of file systems. A first authentication of the user with respect to the system is performed. In response to success of the first authentication with respect to the system, a request by the user is received to access a selected one of the file systems. A second authentication is performed of the user with respect to the selected file system. The user is allowed access to the selected file system in response to success of the second authentication.

DETAILED DESCRIPTION

Described embodiments provide techniques to allow a system providing access to multiple file systems to implement multiple authentication techniques to authenticate users to the system and the file systems. The system may provide one authentication technique to authenticate users with respect to the system and perform additional and different authenticate techniques to authenticate users with respect to the file systems provided by the system. Users may access file systems to which they are separately authenticated. Users may separately authenticate with the system and then separately authenticate with the file system offered through the system. Authentication information may maintain multiple authentication entries for one user indicating that the user is authenticated with the system and separately with one or more file systems.

Figure 1:
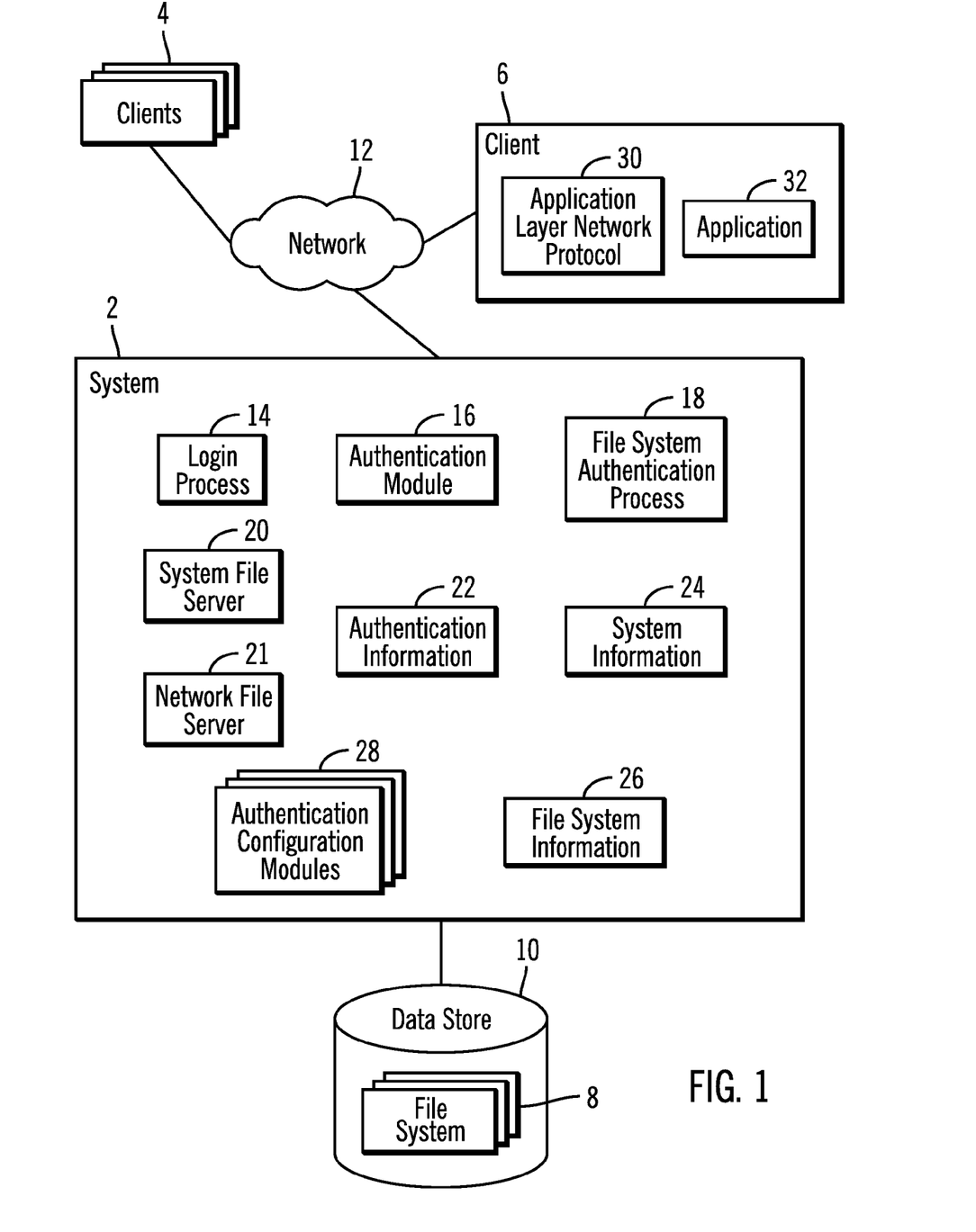
FIG. 1 illustrates a network computing environment in which embodiments are implemented.

FIG. 1 illustrates an embodiment of a network computing environment having a system 2 that provides client systems 4, 6 access to file systems 8 configured in a data store 10 over a network 12. The system 2 may comprise a cloud data storage service provider providing access to the file systems 8 in a cloud computing environment. The users accessing the file systems 8 may comprise tenants in a multi-tenant cloud based storage.

The system 2 includes a login process 14 to handle the authentication and login of clients 4 and 6 to the system 2; an authentication module 16 to manage authentication operations; a file system authentication process 18 to handle the authentication to the file systems 8; a system file server 20 to manage access to the file systems 8 for users authenticated with the system 2; a network file server 21, such as a serving daemon, to manage access request from clients 6 accessing a file system 8 through a file network protocol; authentication information 22 having entries for successful user authentications to the system 2 and the file systems 8; system information 24 having authentication and other information for the system 2; file system information 26 having authentication and other information for the file systems 8; and authentication configuration modules 28 providing authentication schemes to use to authenticate the system 2 and the file systems 8. The authentication information may comprise a file, object, table, etc. having authentication entries for different users and file systems 8.

The system file server 20 may be part of the system 2 operating system. There may be one network file server 21 for all the file systems 8 or network file servers 21 dedicated to one or more of the file systems 8. The network file server 21 may comprise a serving daemon implementing a network file request protocol for managing direct file requests to the file systems 8 from clients 6 not logged onto the system 2, such as Hypertext Transport Protocol (HTTP), SAMBA, etc.

The system 2 may comprise a server class enterprise computing device capable of servicing requests from multiple connected clients 4, 6. The clients 4, 6 may comprise a desktop computer, server, host, portable computing device, such as a smart phone, tablet computing device, telephony device, laptop computer, portable device capable of being mounted in an automobile, etc.

The data store 10 may be implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc. The network 12 may comprise a local area network (LAN), storage area network (SAN), wide area network (WAN), a wireless network, the Internet, etc. The network 12 may include wireless network routers and may be part of a cloud computing model.

The client 6 may include an application layer network protocol 30 to manage file requests from a client application 32. The application layer network protocol 30 may comprise a network file request protocol, such as Hypertext Transport Protocol (HTTP), Common Internet File System (CIFS), etc. With the client 6, the application layer network protocol 30 may forward the requests to the network file server 21 directly to access files in one of the file systems 8 without the user at the client 6 being logged into the system 2 using the login process 14.

In one embodiment, the authentication module 16 may comprise a Pluggable Authentication Module (PAM) for the Linux® operating system. (Linux is a registered trademark of Linus Torvalds). Further, the authentication configuration modules 28 associated with the system 2 and different file systems 8 may implement different authentication schemes and algorithms to provide different types of authentication techniques for the system 2 and the different file systems 8, such as Kerberos, Secure Sockets Layer (SSL), etc.

In described embodiments, the file systems 8 may comprise data file systems or other storage resources for which different authentication techniques may be provided.

Figure 2:
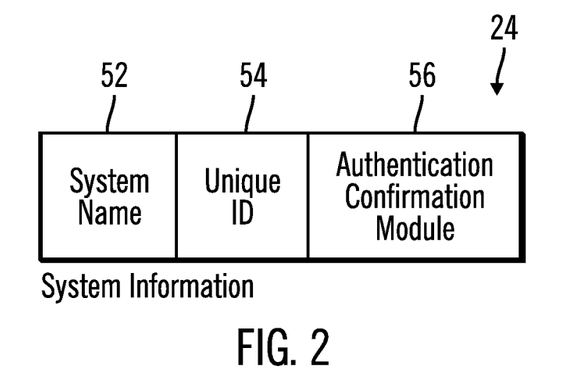
FIG. 2 illustrates an embodiment of system information.

FIG. 2 illustrates an embodiment of the system information 24 as including a system name 52, a unique identifier 54 of the system 2, and indication of an authentication configuration module 56 used to authenticate logins to the system 2. The unique identifier may comprise an identifier assigned by the system 2, such as a unique system identifier (USID).

Figure 3:
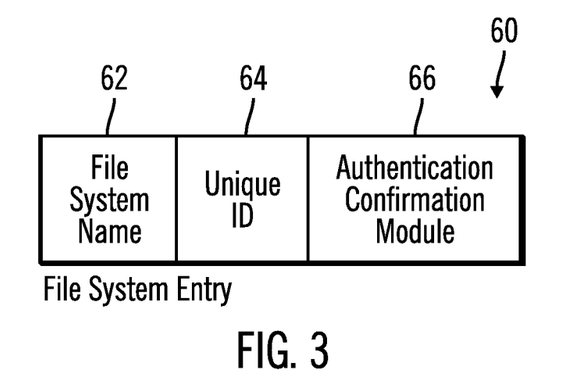
FIG. 3 illustrates an embodiment of a file system entry in file system information.

FIG. 3 illustrates an embodiment of a file system entry 60 in the file system information 26 including a file system name 62, a unique identifier for the file system 64, and indication of an authentication configuration module 66 used to authenticate users trying to access the file system 62. The unique identifier 64 may comprise a unique identifier assigned by the system 2, such as a USID. In certain embodiments, the authentication configuration modules 28 for the system 2 and the different file systems 8 may use the same or different authentication schemes. For instance, one or more of the file systems 8 and the system 2 may use the Kerberos authentication mechanism and others may use a Secure Socket Layer (SSL) based mechanism or other authentication mechanisms. This provides the flexibility of allowing the tenant/user of a file system to designate a preferred authentications scheme to use to authenticate access to the file system resources they are allocated by the system 2 that may differ from authentication schemes used by the system 2 and other tenants of file systems 8.

Figure 4:
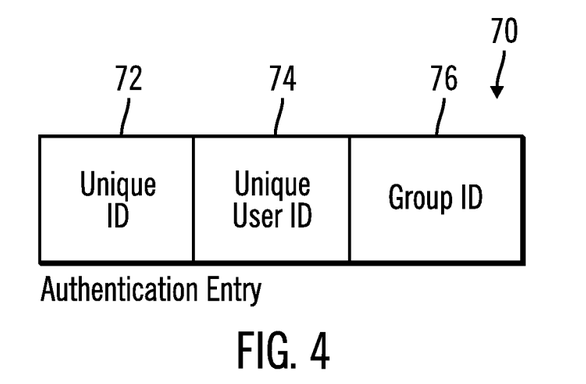
FIG. 4 illustrates an embodiment of an authentication entry in authentication information.

FIG. 4 illustrates an embodiment of an authentication entry 70 as a tuple of data in the authentication information 22 for each user that has authenticated with the system 2 and one or more of the file systems 8. An authentication entry 70 includes a unique identifier 72 of the system 2 or file system 8 to which the authentication is directed; a unique user ID 74 of the user that successfully authenticated; and a group ID 76 of a group to which the user belongs. In the embodiment of FIG. 4, the authentication entry 70 comprises a tuple of information. In an alternative embodiment, the authentication entry 70 may have less information, such as just the unique identifier 72 and the unique user ID 74, or include additional information beyond a tuple.

Figure 5:
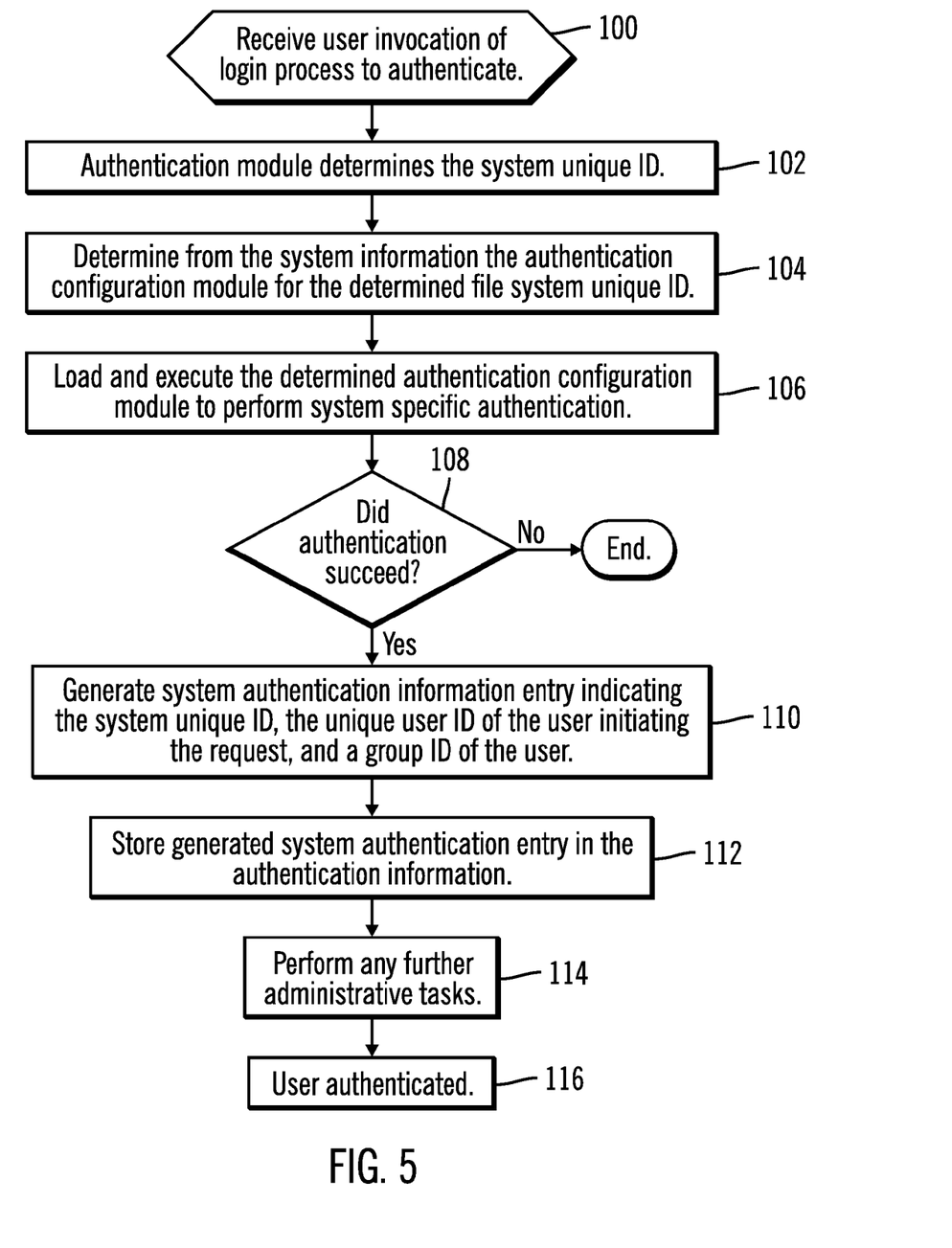
FIG. 5 illustrates an embodiment of operations to authenticate a user with a system providing access to multiple file systems.

FIG. 5 illustrates an embodiment of operations performed by system 2 components, including the login process 14, the authentication module 16, and the authentication configuration modules 28, to authenticate a user with the system 2. Upon receiving (at block 100) a user request to authenticate with the system 2 at the login process 14, the login process 14 invokes the authentication module 16 to determine (at block 102) the system 2 unique identifier 54 (FIG. 2). The authentication module 16, or other component, determines (at block 104) from the system information 24, the authentication configuration module 56 to use for system authentication. The authentication module 16 loads and executes (at block 106) the determined authentication configuration module 28 to perform the system specific authentication of the requesting user. If (at block 108) authentication of the user is successful, then the authentication module 16 (or some other component) generates (at block 110) an authentication entry 70 (FIG. 4) indicating the system unique identifier 54 in field 72, the unique user ID in field 74 and the group ID of the authenticated user in field 76. The generated system authentication entry 70 is stored (at block 112) in the authentication information 22. The login process 14 then performs (at block 114) any additional administrative tasks for the login and the user is authenticated (at block 116) to access system resources. Additional authorization may be required to access system resources following authentication. If (at block 108) authentication failed, then control ends with the user denied access to the system 2.

Figure 6:
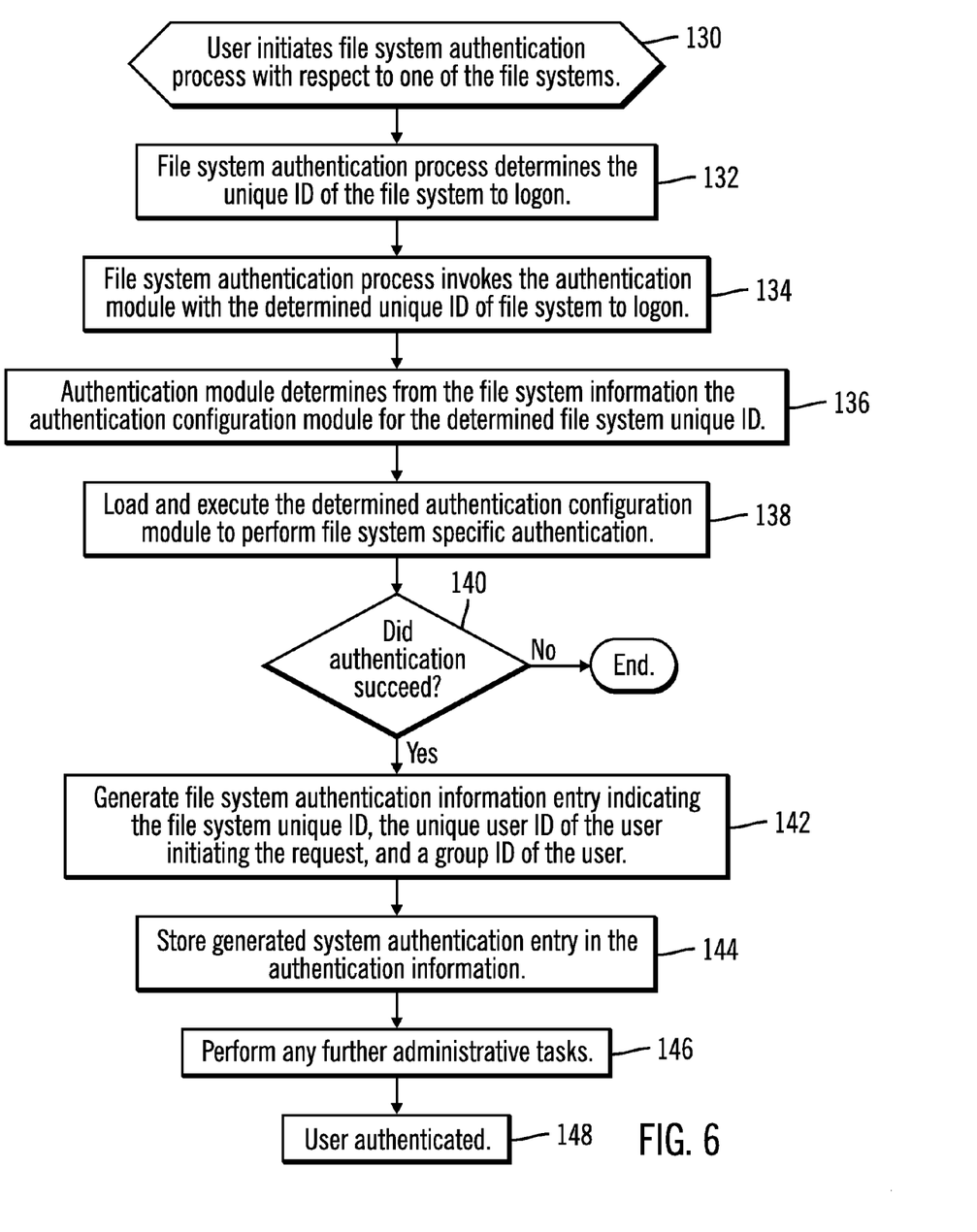
FIG. 6 illustrates an embodiment of operations to authenticate a user with one of the file systems provided through the system.

FIG. 6 illustrates an embodiment of operations performed by system 2 components, including the file system authentication process 18, the authentication module 16 and the authentication configuration modules 28, to authenticate a user with one of the file systems 8 following the user being authenticated with the system 2. Upon the user initiating (at block 130) a file system authentication process 18 with respect to a selected file system 8, the file system authentication process 18 determines (at block 132) the unique identifier of the files system 8 subject to the authentication. The file system authentication process 18 invokes (at block 134) the authentication module 16 with the determined file system unique identifier. The authentication module 16 determines (at block 136) from the file system information 26 the authentication configuration module 28 for the determined file system unique identifier. For instance, the authentication module 16 may determine the file system entry 60 having the provided unique identifier 64 and then determine from that entry 60 the authentication configuration module 66 for that selected file system. The authentication module 16 loads and executes (at block 138) the determined authentication configuration module 28 to perform file system specific authentication. If (at block 140) the user authenticated for the file system, then the authentication module 16 generates (at block 142) a file system authentication information entry 70 indicating the determined file system unique identifier in field 72, the unique user ID of the user initiating the request in field 74, and a group ID of the user in field 76. The generated system authentication entry 70 is stored (at block 144) in the authentication information 22. The file system authentication process 18 performs (at block 146) any further administrative tasks for providing access to the selected file system 8 and the user is then authenticated (at block 148) with respect to the selected file system 8.

Figure 7:
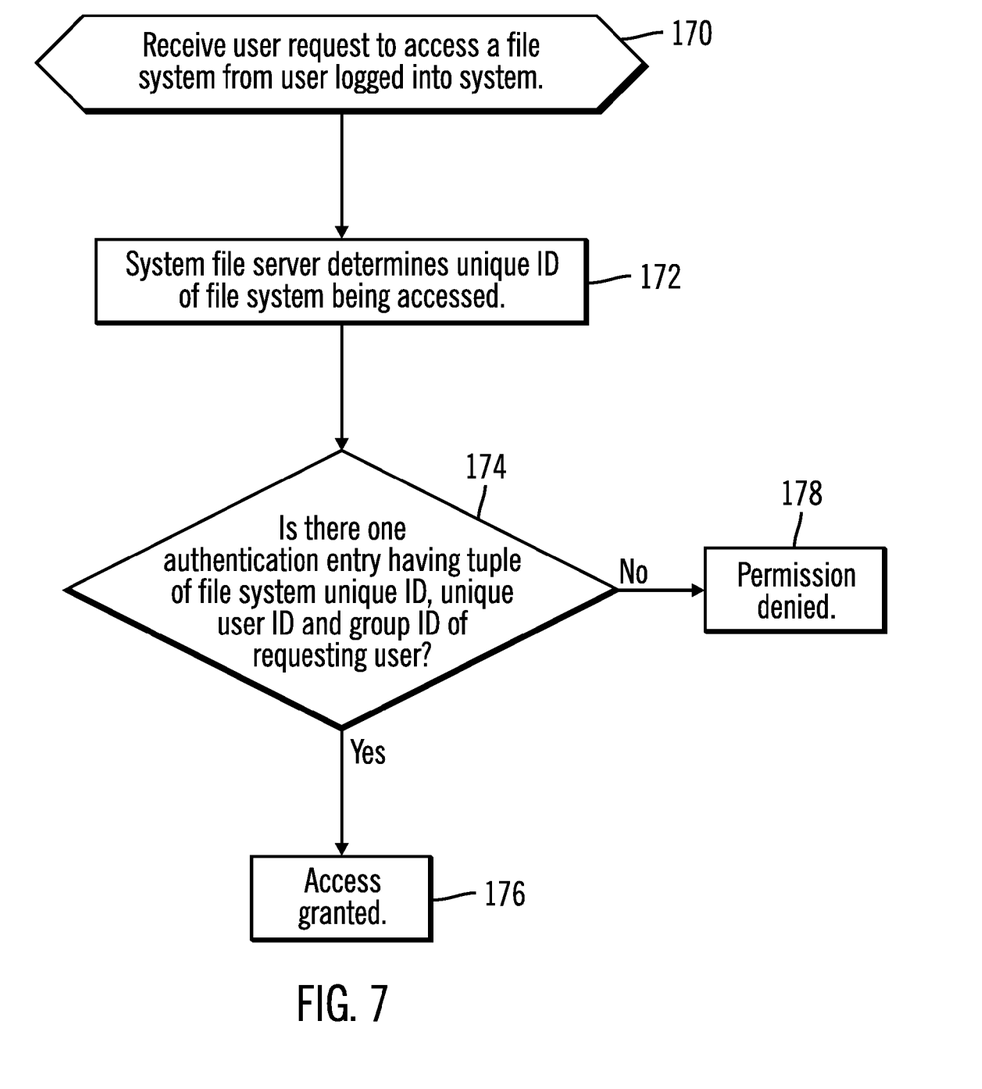
FIGS. 7 and 8 illustrate embodiments of operations to process a user request for access to a file system.

FIG. 7 illustrates an embodiment of operations performed by the components of the system 2, such as the system file server 20, to process a request to access a file system 8 from a user/client 4 already authenticated with the system 2. Upon receiving (at block 170) the user request from the client 4 authenticated with the system 2, the system file server 20 determines the unique identifier of the file system being accessed, such as from the file system entry 60 for the selected file system 8. The system file server 2 determines (at block 174) whether there is one authentication entry 70 having a tuple of the selected file system unique identifier 72, the unique user ID 74 of the user requesting access, and the group ID 76 of the user requesting access. If (at block 174) such a tuple is located, then the system file server 20 grants (at block 176) access to the client 4, otherwise, access is denied (at block 178). Once authentication is verified, additional authorizations may be required to access specific resources in the file system 8 to which the user is authenticated.

Certain file systems 8 may have the same unique identifier as the system 2. In such cases, access to file systems 8 using the system unique identifier may be authenticated by the same technique as used to authenticate the system 2, because the system authentication entry 70 in the authentication information 22 may be used to authenticate for the system 2 and for file systems 8 using the unique identifier. Further, for file systems 8 using the same unique identifier as the system, the user does not need to be separately authenticated for the file system 8 after being authenticated through the system 2, and are authenticated through authentication at the system. However, file systems 8 using the system authentication to authenticate users may provide separate authorization before a system authenticated user is granted access to the file system 8 resources.

Figure 8:
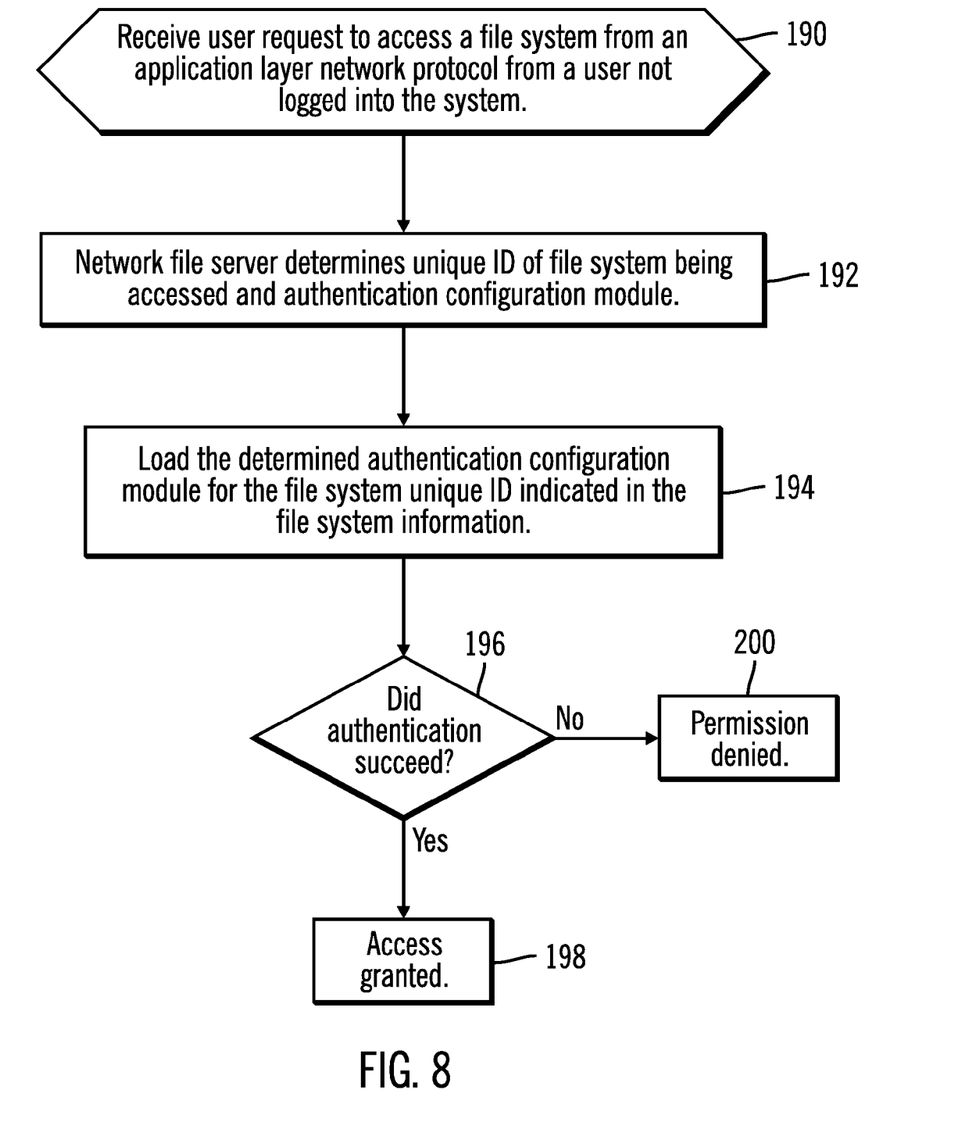

FIG. 8 illustrates an embodiment of operations performed by components of the system 2, such as the network file server 21, the authentication module 16, and the authentication configuration modules 28, to process a user request to access a file system 8 from an application layer network protocol 30 for a user/client 6 not logged onto the system 2, i.e., separately authenticated with the system 2. The application layer network protocol 30 communicates requests directly to the network file server 21. Upon receiving (at block 190) via the network file request, the user request, to access the file, the network file server 21 determines (at block 192) the unique identifier of the selected file system 8 being accessed. This may be determined from the file system entry 60 for the selected file system. The authentication configuration module 28 for the unique identifier of the file system is determined, which may be determined from field 66 of the file system entry 60 for the unique identifier of the file system 62. The network file server 21 may load (at block 194) the determined authentication configuration module 28 for the file system unique identifier indicated in the file system information 26. The loaded authentication configuration module 28 performs the file system specific authentication technique to authenticate the user initiating the request through the network file server 20. If (at block 196) authenticated succeeded, then access is granted (at block 198), else access is denied (at block 200). With the operations of FIG. 8, a client 6 not logged onto the system 2 may access a specific file system 8 through the network file server 21 using the file system authentication process.

Described embodiments provide techniques for a user to authenticate with a system and then separately authenticate with different file systems being provided through the system, such as a cloud data storage services manager. In this way, multiple authentication techniques may be provided to authenticate users for specific file systems in addition to any other authentications they have completed such as to the system and to other file system. Further, with described embodiments, a user may directly authenticate with a file system using the file system specific authentication technique without directly authenticating with the system managing access to the file systems.

Described embodiments provide a technique for separating access to storage resources, such as file systems, by providing for unique identifiers and separate authentication of the storage resources.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing environment may provide cloud based data management including storage multi-tenancy for cloud storage resources, such as file systems. Tenants may comprise separate companies or departments of a company or different applications, that seek to own or access file system storage resources provided by the cloud data manager, such as the system 2.

Figure 9:
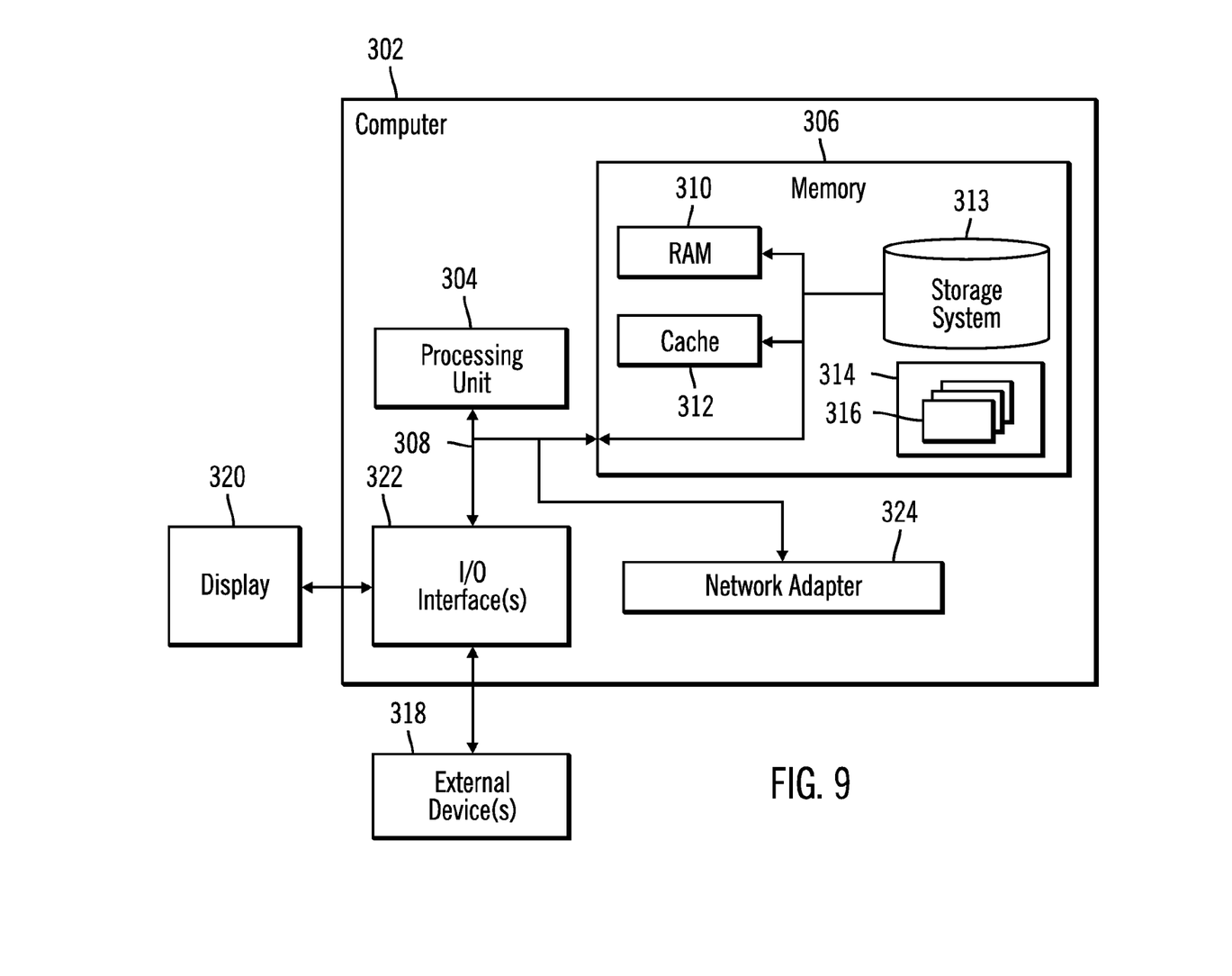
FIG. 9 illustrates an implementation of a computer/server node in the network computing embodiment.
Figure 10:
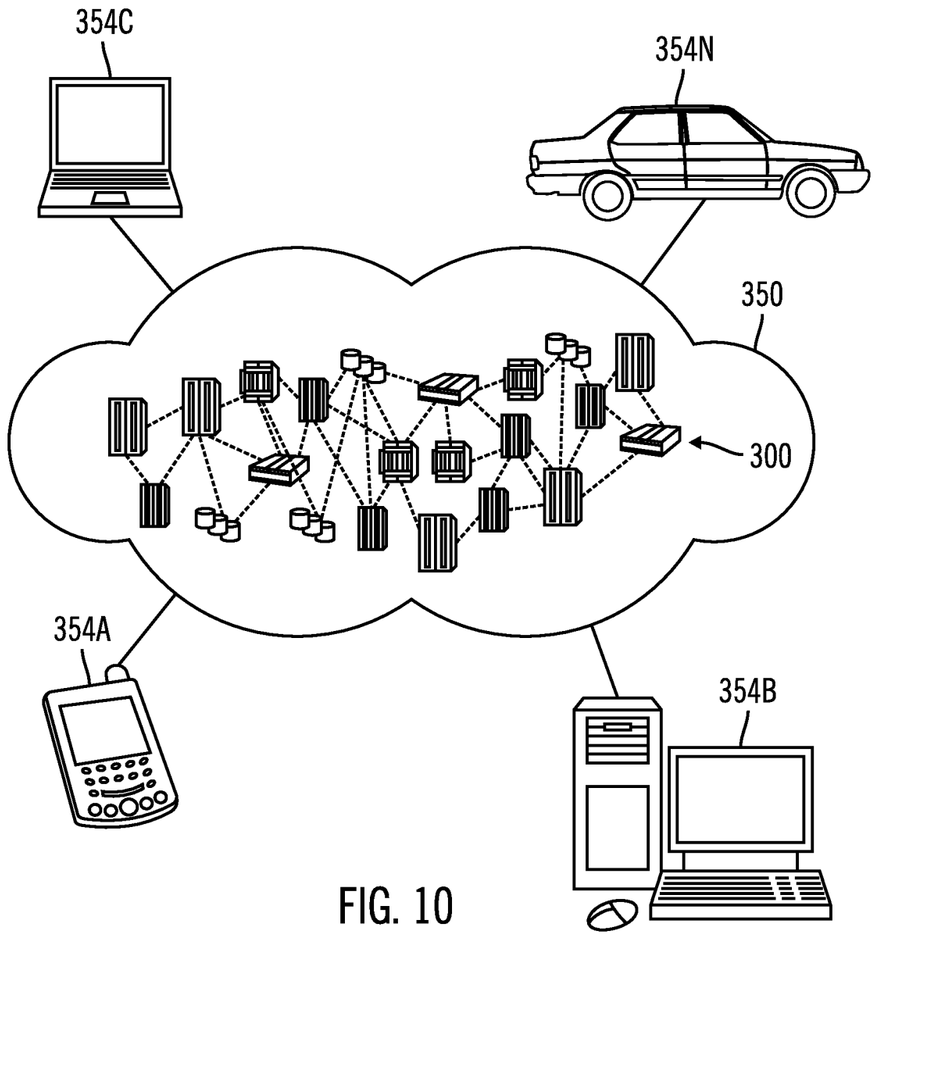
FIG. 10 illustrates an embodiment of a cloud computing environment.
Figure 11:
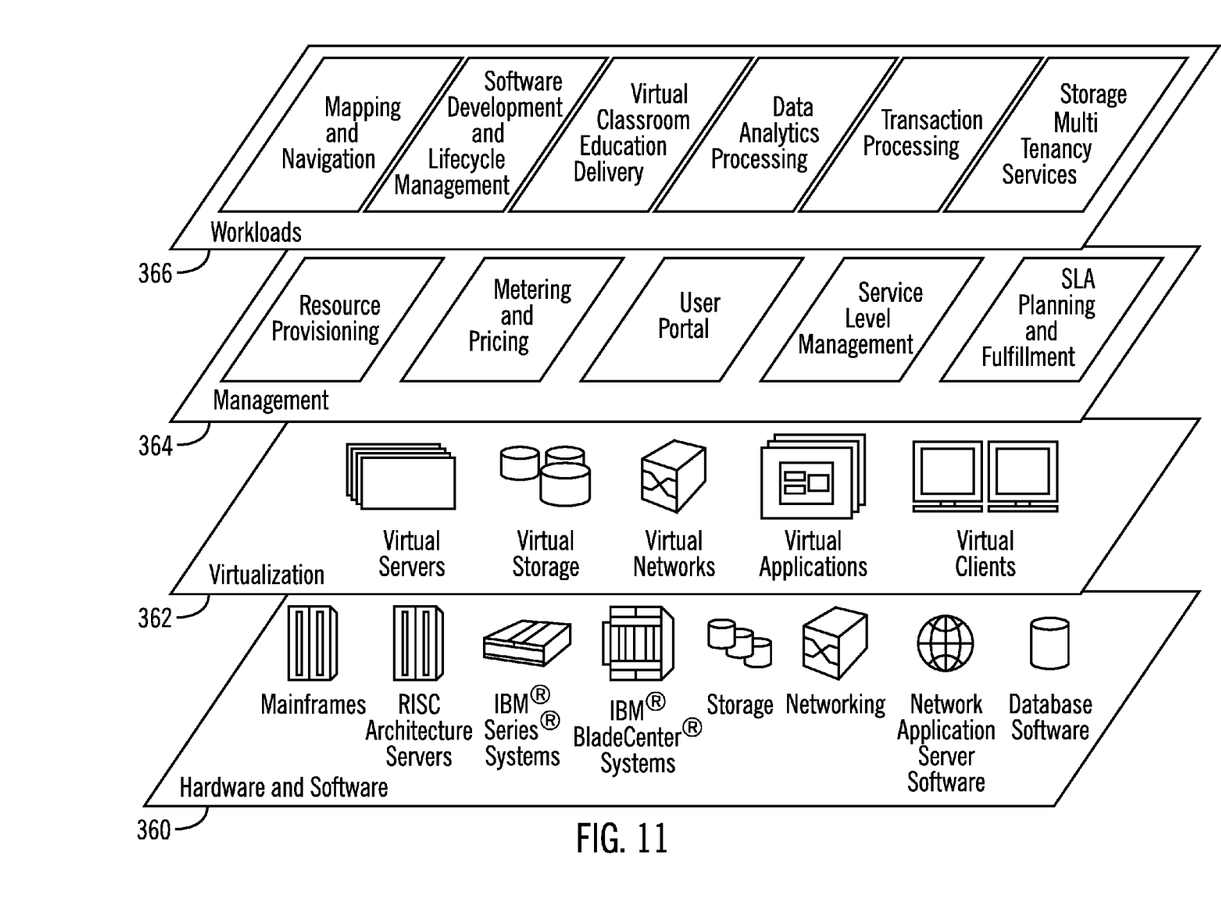
FIG. 11 illustrates an embodiment of abstraction model layers of a cloud computing environment.

The cloud computing implementation is further described with respect to FIGS. 9-11. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 9 illustrates an embodiment of a cloud computing node or computer 300 which may comprise an implementation of the system 2 and the clients 4, 6. Computer 302 is only one example of a suitable cloud computing node and is not intended to suggest any limitation as to the scope of use or functionality of embodiments of the invention described herein. Regardless, cloud computing node 302 is capable of being implemented and/or performing any of the functionality set forth hereinabove.

The cloud computing computer 302 is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Referring to FIG. 10, illustrative cloud computing environment 350 is depicted. As shown, cloud computing environment 350 comprises one or more cloud computing nodes 302 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 15 are intended to be illustrative only and that computing nodes 302 and cloud computing environment 350 can communicate with any type of computerized device over any type of network and/or network addressable connection (e.g., using a web browser).

Referring to FIG. 11, a set of functional abstraction layers provided by cloud computing environment 350 (FIG. 9 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions may provide multi-tenancy for a cloud computing environment such as described with respect to FIGS. 1-8, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for authenticating a user, comprising:
   receiving a request from a user to access a system, wherein the system provides access to a plurality of file systems configured in a computer readable storage medium;
   loading and executing a first authentication configuration module determined for system specific authentication to perform a first authentication of the user with respect to the system;
   in response to success of the first authentication with respect to the system, receiving a request by the user to access a selected one of the file systems;
   loading and executing a second authentication configuration module determined for the selected file system to perform a second authentication of the user with respect to the selected file system; and
   allowing the user access to the selected file system in response to success of the second authentication.

2. The method of claim 1, further comprising:
   generating first authentication information including a first unique identifier of the system and a user identifier of the user in response to success of the first authentication; and
   generating second authentication information including a second unique identifier of the selected file system and the user identifier in response to success of the second authentication, wherein the first and second unique identifiers are different.

3. The method of claim 2, wherein the first authentication information and the second authentication information comprise tuples having the system or file system unique identifier, the user identifier, and a group identifier of the user, wherein different authentication tuples may be generated for one user identifier for different groups to which the user belongs and different file systems to which the user is authenticated.

4. The method of claim 1, wherein further comprising:
   receiving a request by the user to access a file in the selected file system;
   determining a unique identifier of the selected file system;
   determining whether there is authentication information identifying a user identifier of the user requesting access and the determined unique identifier; and
   granting the user access to the requested file in response to determining the authentication information identifying the user identifier of the user and the determined unique identifier of the selected file system.

5. The method of claim 1, wherein the first authentication configuration module and the second authentication configuration module provide different authentication schemes to separately authenticate the user to the system and the file system.

6. The method of claim 1, wherein further comprising:
   receiving, at a network file server, a request for a file system from a client not authenticated with the system through the first authentication; and
   performing by the network file server a third authentication with respect to the requested file system, wherein the network file server grants the user access to the requested file system in response to the success of the third authentication.

7. The method of claim 1, wherein the system implements a cloud based storage management infrastructure to allow multiple tenants to access multiple file systems configured in storage devices managed by the system, wherein the tenants may access the file systems with which the tenant can authenticate using authentication modules associated with the file systems.

8. The method of claim 7, further comprising:
   enabling the tenants of the file systems to select one of a plurality of authentication schemes to use to authenticate users trying to access the file system allocated to the tenant, wherein different file systems are associated with different authentication schemes.

9. The method of claim 1, further comprising:
   providing authentication configuration modules for the system and for each file system having a unique identifier.

10. The method of claim 2, further comprising:
    performing at least one additional authentication of the user with respect to at least one additional file system of the file systems;
    generating additional authentication information, for each additional file system with which the user has successful authentication, identifying the user identifier of the user and an additional unique identifier of the additional file system.

11. The method of claim 4, wherein the authentication information identifying the user identifier and the determined unique identifier is generated in response to authenticating the user to the system when a system unique identifier and the file system unique identifier are identical, and wherein the authentication information identifying the user identifier and the determined unique identifier is generated in response to authenticating the user to the file system when the system unique identifier and the file system unique identifier are different.

12. The method of claim 6, wherein the network file server provides authentication for the file systems for users not authenticated with the system.

13. The method of claim 1, wherein the first and second authentication configuration modules provide authentication schemes to perform the first and second authentication, respectively.

14. A computer program product for authenticating a user, the computer program product comprising a computer readable storage device having computer readable program code embodied therein that executes to perform operations, the operations comprising:
    receiving a request from a user to access a system, wherein the system provides access to a plurality of file systems;
    loading and executing a first authentication configuration module determined for system specific authentication to perform a first authentication of the user with respect to the system; in response to success of the first authentication with respect to the system, receiving a request by the user to access a selected one of the file systems;
    loading and executing a second authentication configuration module determined for the selected file system to perform a second authentication of the user with respect to the selected file system; and
    allowing the user access to the selected file system in response to success of the second authentication.

15. The computer program product of claim 14, wherein the operations further comprise:
generating first authentication information including a first unique identifier of the system and a user identifier of the user in response to success of the first authentication; and
generating second authentication information including a second unique identifier of the selected file system and the user identifier in response to success of the second authentication, wherein the first and second unique identifiers are different.

16. The computer program product of claim 15, wherein the first authentication information and the second authentication information comprise tuples having the system or file system unique identifier, the user identifier, and a group identifier of the user, wherein different authentication tuples may be generated for one user identifier for different groups to which the user belongs and different file systems to which the user is authenticated.

17. The computer program product of claim 15, wherein the operations further comprise:
performing at least one additional authentication of the user with respect to at least one additional file system of the file systems;
generating additional authentication information, for each additional file system with which the user has successful authentication, identifying the user identifier of the user and an additional unique identifier of the additional file system.

18. The computer program product of claim 14, wherein the operations further comprise:
receiving a request by the user to access a file in the selected file system;
determining a unique identifier of the selected file system;
determining whether there is authentication information identifying a user identifier of the user requesting access and the determined unique identifier; and
granting the user access to the requested file in response to determining the authentication information identifying the user identifier of the user and the determined unique identifier of the selected file system.

19. The computer program product of claim 18, wherein the authentication information identifying the user identifier and the determined unique identifier is generated in response to authenticating the user to the system when a system unique identifier and the file system unique identifier are identical, and wherein the authentication information identifying the user identifier and the determined unique identifier is generated in response to authenticating the user to the file system when the system unique identifier and the file system unique identifier are different.

20. The computer program product of claim 14, wherein the first authentication configuration module and the second authentication configuration module provide different authentication schemes to separately authenticate the user to the system and the file system.

21. The computer program product of claim 14, wherein the operations further comprise:
receiving, at a network file server, a request for a file system from a client not authenticated with the system through the first authentication; and
performing by the network file sewer a third authentication with respect to the requested file system, wherein the network file server grants the user access to the requested file system in response to the success of the third authentication.

22. The computer program product of claim 21, wherein the network file server provides authentication for the file systems for users not authenticated with the system.

23. The computer program product of claim 14, wherein the system implements a cloud based storage management infrastructure to allow multiple tenants to access multiple file systems configured in storage devices managed by the system, wherein the tenants may access the file systems with which the tenant can authenticate using authentication modules associated with the file systems.

24. The computer program product of claim 23, wherein the operations further comprise:
enabling the tenants of the file systems to select one of a plurality of authentication schemes to use to authenticate users trying to access the file system allocated to the tenant, wherein different file systems are associated with different authentication schemes.

25. The computer program product of claim 14, wherein the operations further comprise:
providing authentication configuration modules for the system and for each file system having a unique identifier.

26. The computer program product of claim 14, wherein the first and second authentication configuration modules provide authentication schemes to perform the first and second authentication, respectively.

27. A system in communication with a storage and at least one user operating at least one client computer connected over a network, comprising:
a processor;
a computer readable storage device having computer readable code executed by the processor to perform operations, the operations comprising:
providing access to a plurality of file systems configured in the storage;
receiving a request from a requesting user comprising one of the at least one user to access the system;
loading and executing a first authentication configuration module determined for system specific authentication to perform a first authentication of the requesting user with respect to the system;
in response to success of the first authentication with respect to the system, receiving a request by the requesting user to access a selected one of the file systems;
loading and executing a second authentication configuration module determined for the selected file system to perform a second authentication of the requesting user with respect to the selected file system; and
allowing the requesting user access to the selected file system in response to success of the second authentication.

28. The system of claim 27, wherein the operations further comprise:
generating first authentication information including a first unique identifier of the system and a user identifier of the requesting user in response to success of the first authentication; and
generating second authentication information including a second unique identifier of the selected file system and the user identifier in response to success of the second authentication, wherein the first and second unique identifiers are different.

29. The system of claim 28, wherein the first authentication information and the second authentication information comprise tuples having the system or file system unique identifier, the user identifier, and a group identifier of the requesting user, wherein different authentication tuples may be generated for one user identifier for different groups to which the requesting user belongs and different file systems to which the requesting user is authenticated.

30. The system of claim 27, wherein the operations further comprise:
   receiving a request by the requesting user to access a file in the selected file system;
   determining a unique identifier of the selected file system;
   determining whether there is authentication information identifying a user identifier of the requesting user and the determined unique identifier; and
   granting the user access to the requested file in response to determining the authentication information identifying the user identifier of the requesting user and the determined unique identifier of the selected file system.

31. The system of claim 27, wherein the first authentication configuration module and the second authentication configuration module provide different authentication schemes to separately authenticate the user to the system and the file system.

32. The system of claim 27, wherein the operations flirther comprise:
   receiving, at a network file server, a request for a file system from a client not authenticated with the system through the first authentication; and
   performing by the network file sewer a third authentication with respect to the requested file system, wherein the network file server grants the requesting user access to the requested file system in response to the success of the third authentication.

33. The system of claim 27, wherein the system implements a cloud based storage management infrastructure to allow multiple tenants to access multiple file systems configured in storage devices managed by the system, wherein the tenants may access the file systems with which the tenant can authenticate using authentication modules associated with the file systems.

34. The system of claim 33, wherein the operations further comprise:
   enabling the tenants of the file systems to select one of a plurality of authentication schemes to use to authenticate users trying to access the file system allocated to the tenant, wherein different file systems are associated with different authentication schemes.

35. The system of claim 27, wherein the operations further comprise:
   providing authentication configuration modules for the system and for each file system having a unique identifier.

36. The system of claim 27, wherein the first and second authentication configuration modules provide authentication schemes to perform the first and second authentication, respectively.

* * * * *